(12) United States Patent
Capurso et al.

(10) Patent No.: US 7,167,167 B2
(45) Date of Patent: Jan. 23, 2007

(54) WRITE HEAD FOR A DISPLAY TAG HAVING A LIQUID CRYSTAL DISPLAY

(75) Inventors: Robert G. Capurso, Bergen, NY (US); David M. Johnson, Rochester, NY (US); Domenic Maiola, Rochester, NY (US); James M. Papa, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 152 days.

(21) Appl. No.: 10/307,711

(22) Filed: Dec. 2, 2002

(65) Prior Publication Data

US 2004/0104901 A1   Jun. 3, 2004

(51) Int. Cl.
*G09F 3/20* (2006.01)
*G09F 9/00* (2006.01)
*G09F 3/04* (2006.01)
*G06K 15/00* (2006.01)
*G06Q 20/00* (2006.01)

(52) U.S. Cl. ............... 345/204; 40/5; 40/448; 40/450; 40/452; 235/383; 235/385; 705/20; 705/23

(58) Field of Classification Search ............ 235/383; 439/10, 11, 13, 31, 137, 344, 633; 705/20, 705/23; 345/204
See application file for complete search history.

(56) References Cited

U.S. PATENT DOCUMENTS

| | | | | |
|---|---|---|---|---|
| 3,628,266 | A | * 12/1971 | Wise et al. | ............... 40/654.01 |
| 4,438,950 | A | * 3/1984 | Hamisch, Jr. | ................ 283/70 |
| 5,111,196 | A | * 5/1992 | Hunt | ................ 340/5.91 |
| 5,326,271 | A | * 7/1994 | Kishi et al. | ................ 439/72 |
| 5,553,412 | A | * 9/1996 | Briechle et al. | ........ 40/124.01 |
| 5,562,473 | A | * 10/1996 | Ikeya et al. | ................ 439/331 |
| 5,751,257 | A | 5/1998 | Sutherland | |
| 5,812,985 | A | * 9/1998 | Failing et al. | ................ 705/5 |
| 5,961,338 | A | 10/1999 | Wu et al. | |
| 6,253,190 | B1 | 6/2001 | Sutherland | |
| 6,269,342 | B1 | 7/2001 | Brick et al. | |
| 6,606,029 | B1 | * 8/2003 | Okamura | ................ 340/572.8 |

OTHER PUBLICATIONS

U.S. Appl. No. 10/134,185, filed Apr. 29, 2002 by Stephenson et al.

* cited by examiner

*Primary Examiner*—Sumati Lefkowitz
*Assistant Examiner*—Alexander S. Beck
(74) *Attorney, Agent, or Firm*—Kathleen Nenner Manne; Lynne M. Blank

(57) ABSTRACT

Apparatus for changing the display state of a bistable liquid crystal display on a display tag having a plurality of electrical contact pads connected to a corresponding plurality of electrodes in the liquid crystal display includes a body defining a slot for receiving and locating the display tag with respect to the body; a plurality of contact pins located in the body and being mounted for movement into the slot to contact the electrical contact pads of a display tag located in the slot; drive electronics electrically connected to the contact pins for receiving display command signals from an external source and for applying electrical drive signals to the electrodes of the display when the contact pins are in contact with the electrical contact pads; and operator control means for moving the contact pins into electrical contact with the electrical contact pads and causing the drive electronics to apply the electrical drive signals to the contact pins.

11 Claims, 7 Drawing Sheets

WRITE HEAD FOR A DISPLAY TAG HAVING A LIQUID CRYSTAL DISPLAY

FIELD OF THE INVENTION

The present invention relates to a write head for changing the state of a bistable liquid crystal display on a display tag.

BACKGROUND OF THE INVENTION

U.S. Pat. No. 5,751,257, issued May 12, 1998 and U.S. Pat. No. 6,253,190 issued Jun. 26, 2001, both to Sutherland, show a system including a programmable shelf tag having a bistable liquid crystal display for displaying price data and a Universal Product Code (UPC) bar code, wherein the information programmed in the display remains on the display in the absence of power. The shelf tag has a set of synchronizing indicators and corresponding electrical contacts on the front side of the display. The shelf tag is constructed by forming patterned conductive character elements on top and bottom substrates and sandwiching a polymer stabilized liquid crystal between the patterned character elements.

The shelf tag disclosed by Sutherland is programmable with a hand held device that is in communication with a central computer that contains inventory and price information. The hand held device can be used to scan the synchronizing indicators to identify the location of the electrical contacts and supplies the electrical contacts with electrical signals to write appropriate information on the shelf tag. For inventory control and price updates, the hand held device is used to first read the UPC bar code on the shelf tag. If a price needs to be updated, the hand held device is then used to write the appropriate price information into the tag.

One problem with the system as described by Sutherland is that since each element of the display is written sequentially, a time is required to swipe the hand held device across the label. Another problem is the difficulty of maintaining consistent contact with the electrical contacts of the display as the hand held writing device is swept across the display.

There is a need therefore for an improved display tag writing device that avoids the problems noted above.

SUMMARY OF THE INVENTION

The need is met according to the present invention by providing apparatus for changing the display state of a bistable liquid crystal display on a display tag having a plurality of electrical contact pads connected to a corresponding plurality of electrodes in the liquid crystal display that includes a body defining a slot for receiving and locating the display tag with respect to the body; a plurality of contact pins located in the body and being mounted for movement into the slot to contact the electrical contact pads of a display tag located in the slot; drive electronics electrically connected to the contact pins for receiving display command signals from an external source and for applying electrical drive signals to the electrodes of the display when the contact pins are in contact with the electrical contact pads; and operator control means for moving the contact pins into electrical contact with the electrical contact pads and causing the drive electronics to apply the electrical drive signals to the contact pins.

ADVANTAGES

The present invention has the advantage that the display tag can be reliably located with respect to the contact pins and all of the electrodes on the display can be addressed simultaneously.

DETAILED DESCRIPTION OF THE INVENTION

Figure 1:
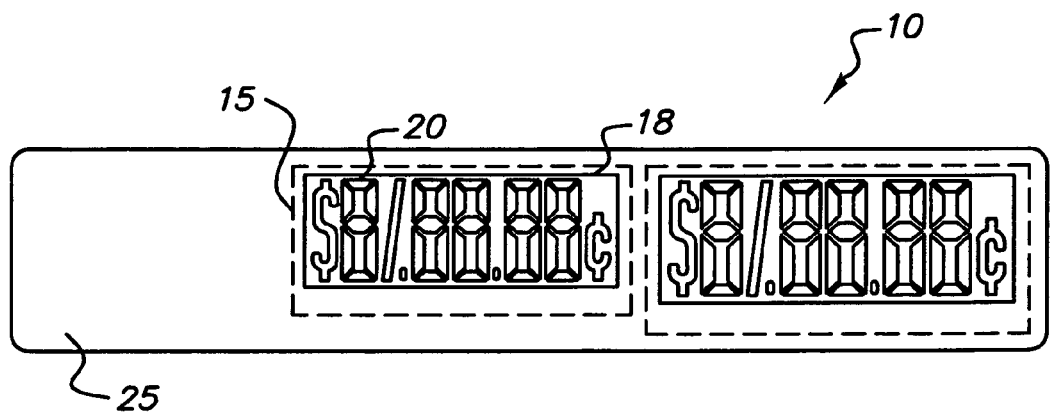
FIG. 1 is a front view of a shelf tag useful with the present invention.

FIG. 1 shows a shelf tag 10 comprised of one or more displays 15 constructed by forming patterned conductive character elements 20 on top and bottom substrates and sandwiched polymer stabilized liquid crystals between patterned character elements 20. The displays 15 can be made as shown in U.S. Ser. No. 10/134,185 filed Apr. 29, 2002 by Stephenson et al., which is incorporated herein by reference.

Shelf tag 10 has one or more perforated windows 18 to allow character elements 20 on displays 15 to be viewed from the front printable side 25 of a shelf tag 10. Printable surface 25 allows the printing of static readable information such as bar code and item description on the surface 25 for example by an inkjet printer.

Figure 2:
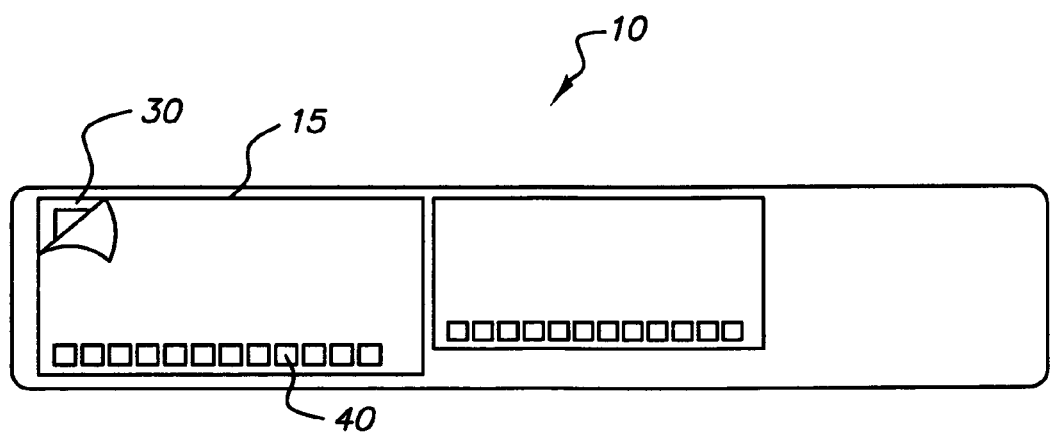
FIG. 2 is a rear view of the shelf tag of FIG. 1.

The reverse side of the shelf tag 10 shown in FIG. 2 has an adhesive backing 30 to allow attachment of a display 15 to the back side of the shelf tag 10. Electrically conductive display contacts pads 40 on display 15 attached to adhesive backing 30 are exposed on the rear of the shelf tag 10.

Figure 3:
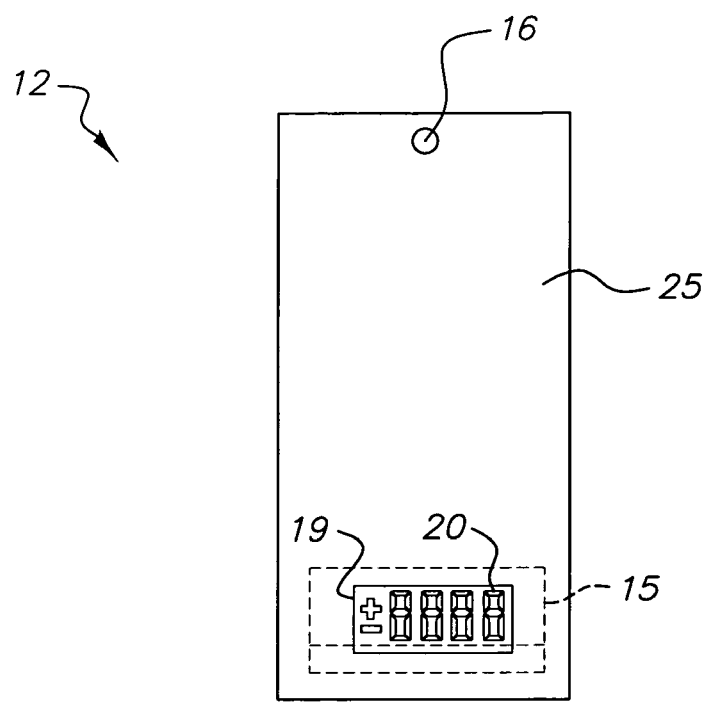
FIG. 3 is a front view of an item tag useful with the present invention.
Figure 4:
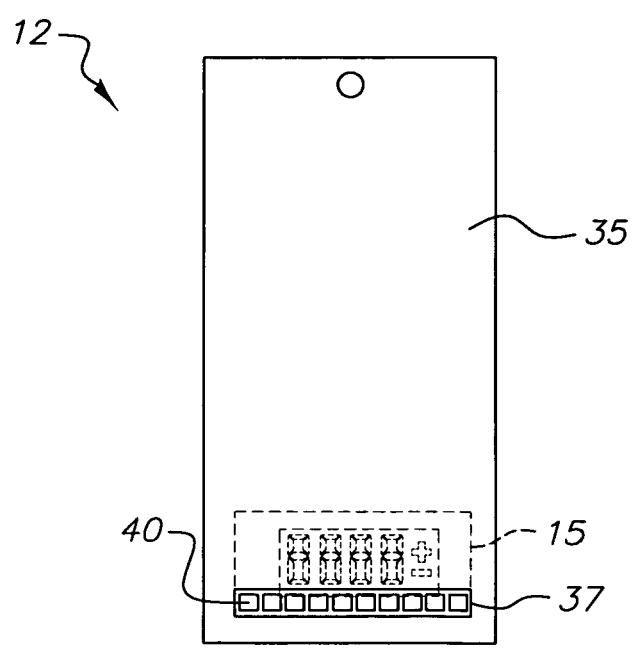
FIG. 4 is rear view of the item tag of FIG. 3.

A second embodiment, useful for example, as an item tag is shown in FIG. 3. The item tag 12 is provided with a hole 16 for attachment to an item such as apparel. A display 15 is sandwiched between a printable surface 25 and a backer 35 with a perforated window 19 provided in the printable surface 25, allowing the conductive character elements 20 to be viewed through the window 19. A back view of the item tag 12 shown in FIG. 4 shows a display 15 in position in window 19 to allow contact pads 40 to show through a window 37 provided in backer 35.

Figure 5:
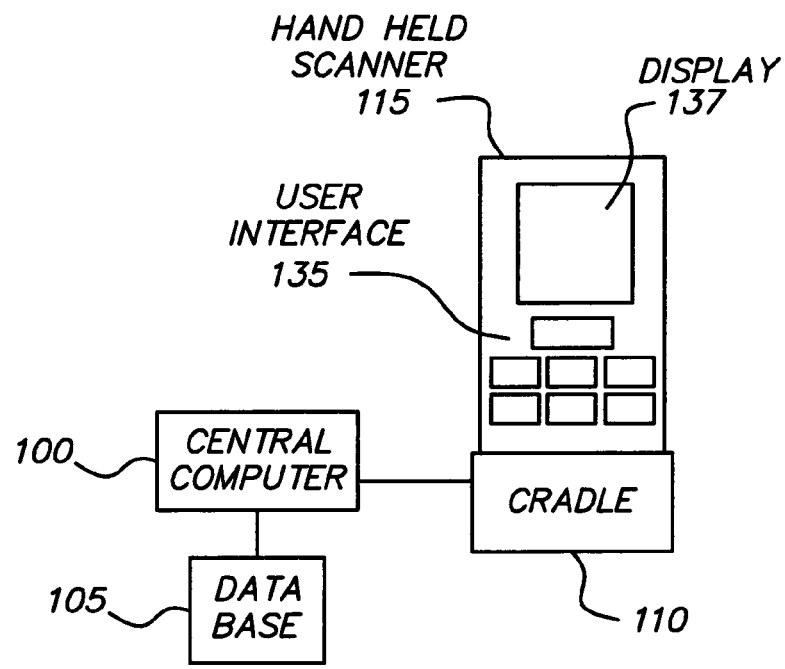
FIG. 5 is a schematic block diagram of a system employing a hand held scanner having a write head according to the present invention.

An inventory control system, shown in FIG. 5, includes a central computer 100, a database 105 accessible by the central computer, and a docking cradle 110 for receiving a portable hand held scanner 115. The portable hand held scanner 115 can be placed in the cradle 110 to receive information from the central computer 100 and database 105.

Figure 6:
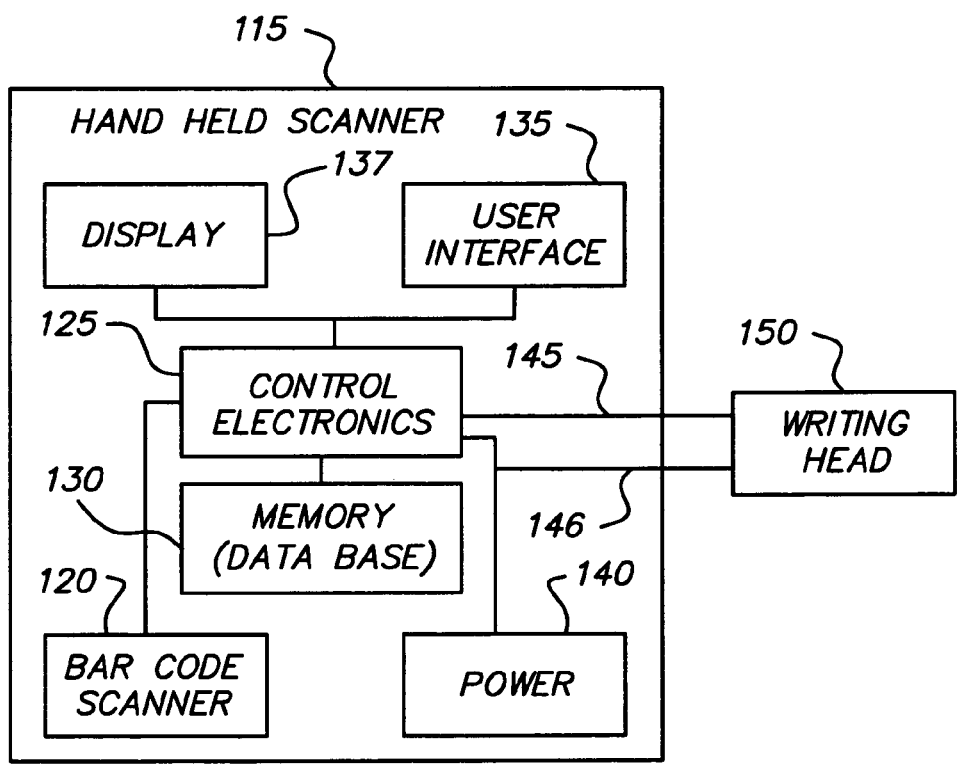
FIG. 6 is schematic block diagram of a hand held scanner having a write head according to the present invention.

The hand held scanner 115 is illustrated further in FIG. 6. The hand held scanner includes control electronics 125, a memory (containing a database) 130, a bar code scanner 120, a user interface 135, and a power source 140. A writing head according to the present invention 150 is linked by a data cable 145 and power cable 146 to the hand held scanner 115.

In operation, information regarding the need to update a display on a particular item tag or a shelf tag is downloaded from central computer 100 into memory 130, where the update information is stored in association with data corresponding to the bar code on the tag. An operator places the hand held scanner adjacent a tag and employs the user interface 135 which may be, for example, a button or keypad, to initiate a scan of the bar code information printed on the tag. Control electronics 125 retrieves information from the memory (database) 130 related to the bar code on the tag and displays information on the display 137, instructing the operator whether or not a change is required to the information displayed on the tag.

Figure 7:
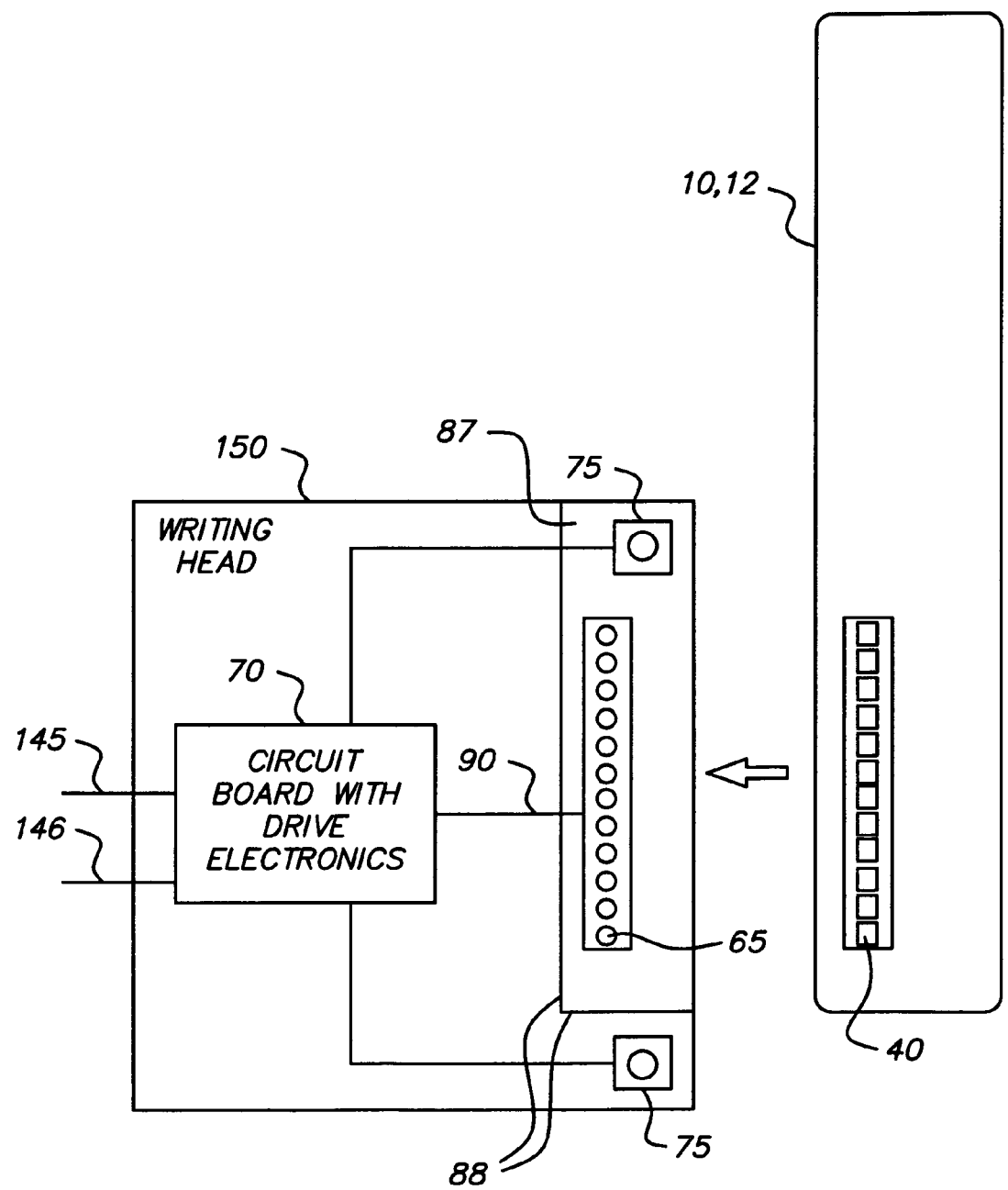
FIG. 7 is schematic block diagram of a write head according to the present invention.
Figure 8:
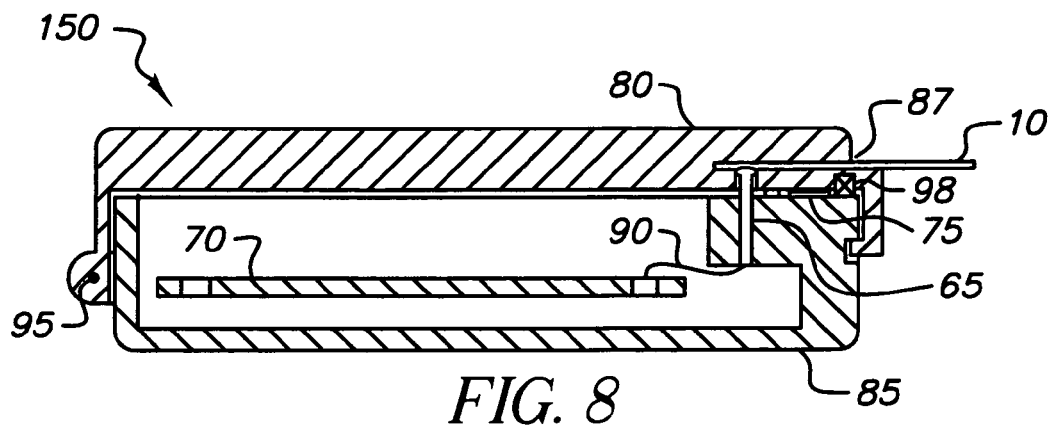
FIG. 8 is cross sectional view of one embodiment of a write head according to the present invention.

Referring to FIGS. 7 and 8, a writing head 150 according to the present invention includes an upper body portion 80 defining a slot 87 and tag locating stops 88 for receiving and locating a display tag (10, 12) with respect to the upper body portion 80. A plurality of contact pins 65 are located in a lower body portion 85 and are mounted for movement into the slot 87 to contact the electrical contact pads 40 of a tag located in the slot. Drive electronics 70 are electrically connected to the contact pins 65 by wires 90 for receiving display command signals from an external source such as the hand held scanner 115, or a computer, and for applying electrical drive signals to the electrodes 40 of the display on the tag when the contact pins 65 are in contact with the electrical contact pads 40 of the display. The upper body portion 80 is hinged 95 to the lower body portion 85 and is urged away from lower body portion 85 by a spring 98, whereby an operator may squeeze the upper and lower body portions together to move the contact pins into electrical contact with the electrical contact pads. A switch 75 connected to the drive electronics 70 senses when the body portions have been moved together and signals the drive electronics to apply the electrical drive signals to the contact pins.

Figure 9:
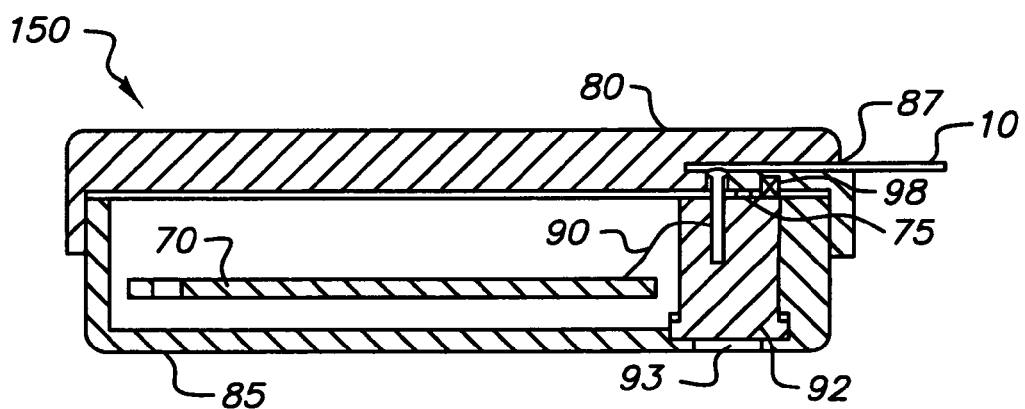
FIG. 9 is cross sectional view of an alternative embodiment of a write head according to the present invention.

Referring to FIG. 9, an alternative embodiment of the writing head 150 employs a sliding block 92 containing the contact pins 65. The sliding block is mounted in the lower body portion 85 and is urged away from the slot 87 by a spring 98. The sliding block 92 includes an exposed end 93 that may be pushed by an operator against the force of spring 98 to bring the contact pins into electrical contact with the electrical contact pads on a tag in the slot. Upon closing switch 75, the drive electronics electronic 70 applies the electrical drive signals to the contact pins.

Figure 10:
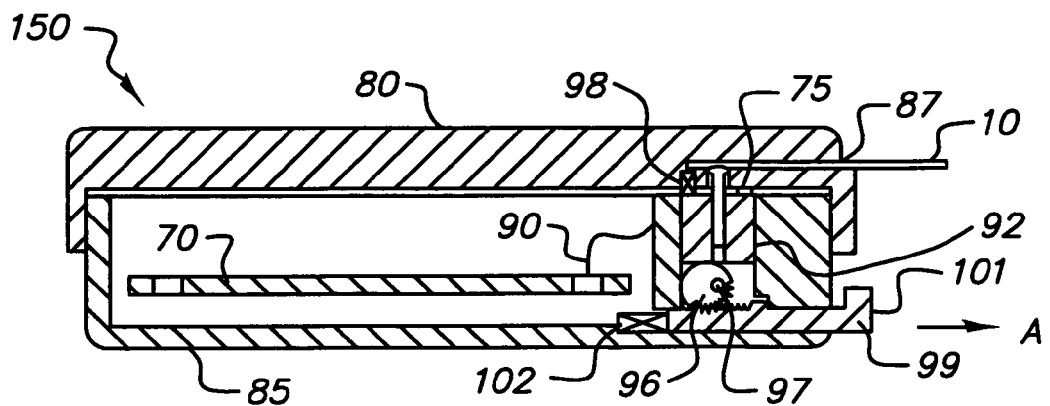
FIG. 10 is cross sectional view of an alternative embodiment of a write head according to the present invention.

Referring to FIG. 10, a further alternative embodiment of the writing head 150 is shown. In this embodiment, the sliding block 92 is urged into contact with the electrical contact pads by a cam 96 connected to a pinion 97 that is driven by a rack 99. A spring 102 urges the rack 99 in the direction indicated by arrow A. An end 101 of rack 99 extends beyond body portion 85 where it can be moved by an operator against spring 102 to actuate the write head 150. It will be apparent to one of ordinary skill in the art that other means can be employed for actuating the write head to bring the contact pins into electrical contact with the electrical contact pads on a tag in the slot.

If a change in the state of display 15 is required to a tag (10 or 12), the operator uses writing head 150 to update the information displayed on the tag. The tag (10 or 12) is inserted into slot 87 and urged into position stops 88. The contact pads 40 of display 15 are now properly aligned with contact pins 65. A force is applied by the operator to bring the contact pins 65 into contact with the pads 40 in display 15. When enough force is applied to close switches 75 in write head 150, an electronic signal is sent from the hand held control electronics 70 via wiring 90 to the contact pins 65 and hence the contact pads 40, thus changing the state of conductive character elements 20 to the new display state.

Figure 11:
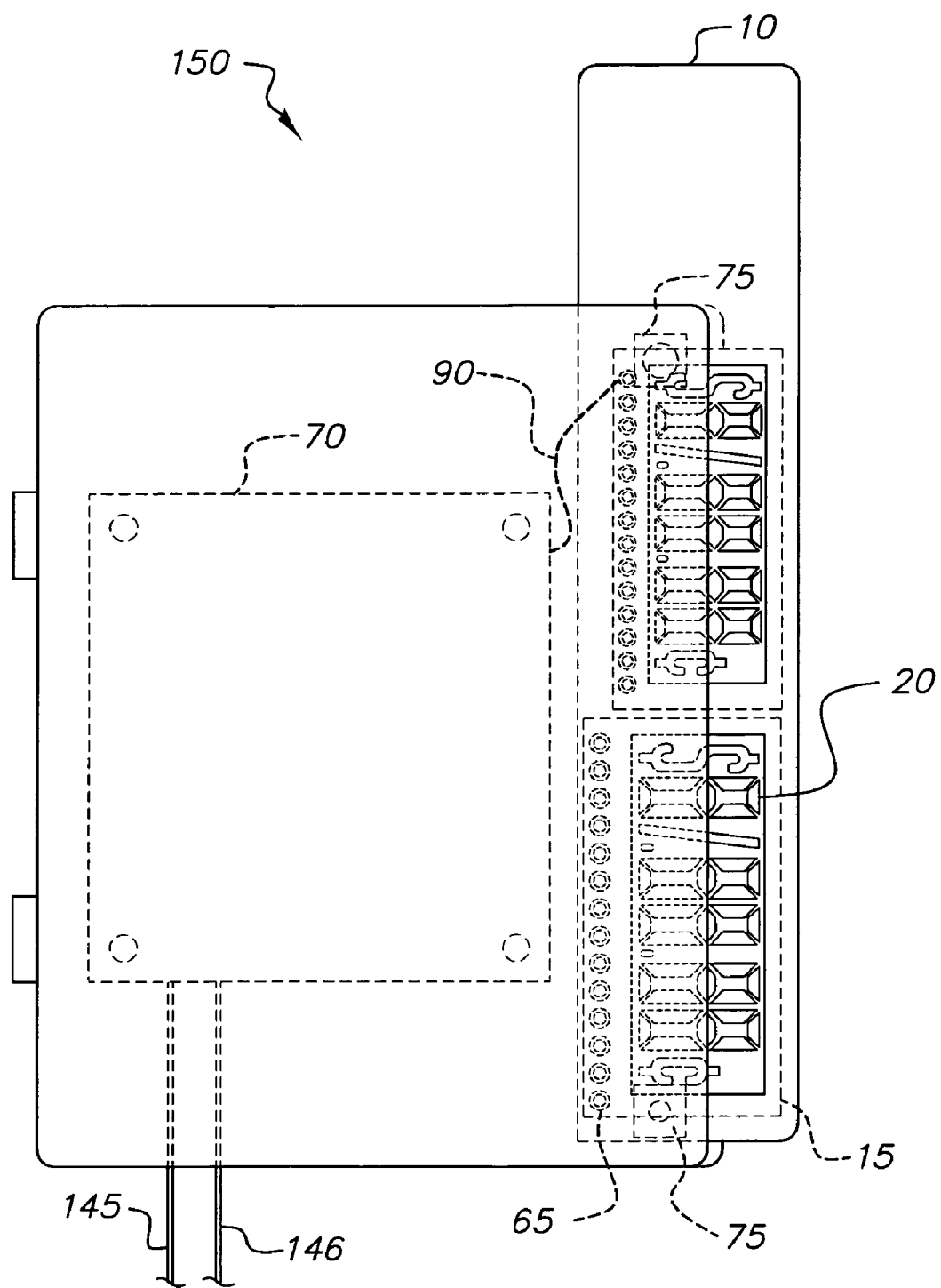
FIG. 11 is a top view of a write head according to one embodiment of the present invention.
Figure 12:
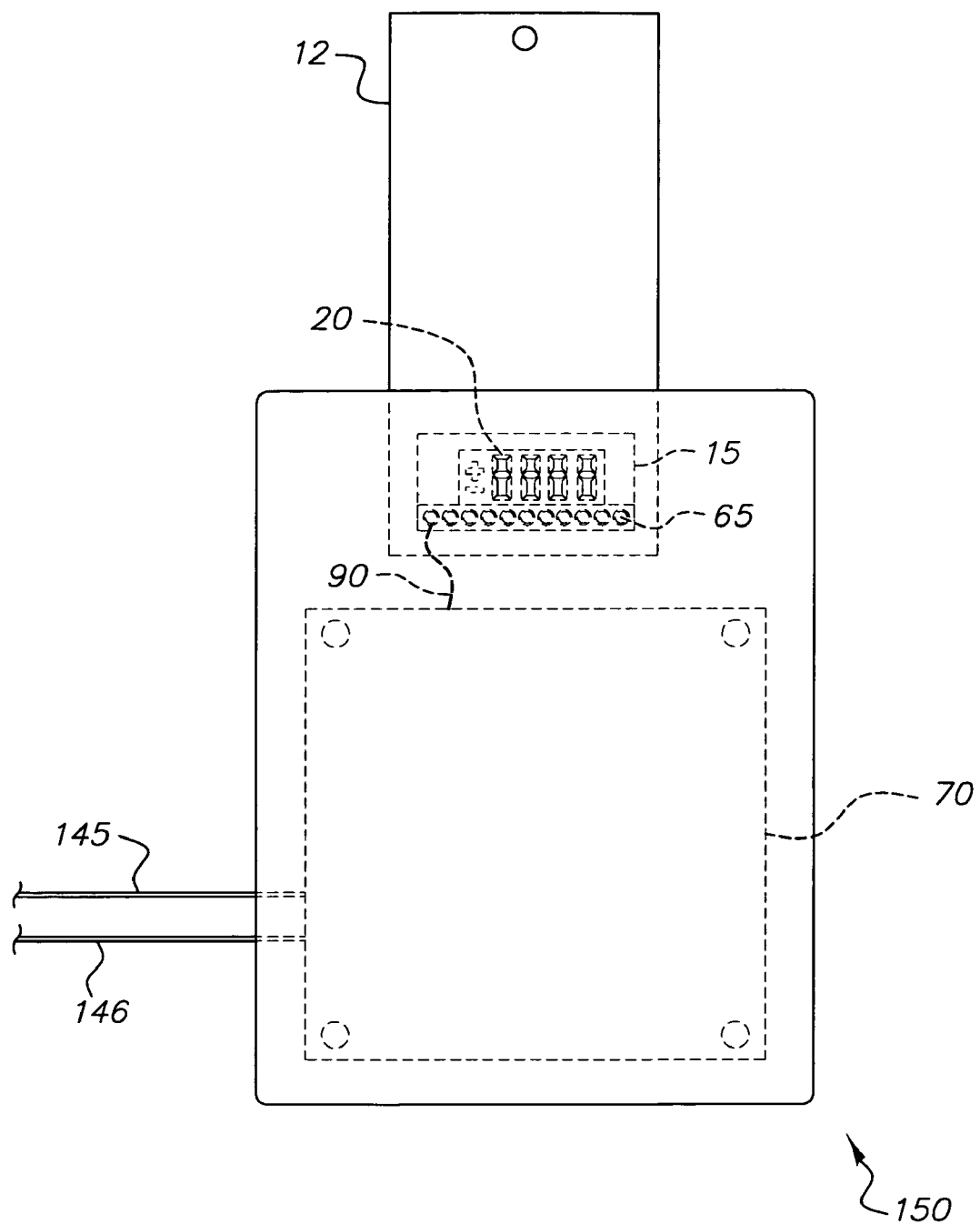
FIG. 12 is a top view of a write head according to a second embodiment of the present invention.

FIG. 11 is a top view of a writing head 150 that is configured specifically for writing to shelf tags 10. FIG. 12 is a top view of a writing head 150 that is configured specifically for writing to item tags 12. In both embodiments, the plurality of pins 65 are aligned with the contact pads 40 of a display 15 on the tag.

The invention has been described in detail with particular reference to certain preferred embodiments thereof, but it will be understood that variations and modifications can be effected within the spirit and scope of the invention.

PARTS LIST

10 shelf tag
12 item tag
15 display
16 hole
18 perforated window in shelf tag
19 perforated window in item tag
20 conductive character element
25 printable surface
30 adhesive backing
35 item tag backer
37 perforated window in item tag backer
40 contact pads
65 contact pins
70 circuit board and drive electronics
75 switch
80 upper body portion
85 lower body portion
87 slot
88 tag locating stops
90 wiring
92 sliding block
93 exposed block end
95 hinge
96 cam
97 pinion
98 spring
99 rack
100 central computer
101 end of rack
102 spring
105 database
110 docking cradle
115 hand held scanner
120 bar code scanner
125 control electronics
130 memory (database)
135 user interface
137 display
140 power supply
145 data cable 146 power cable
150 writing head

What is claimed is:

1. An apparatus for changing the display state of a bistable liquid crystal display of a display tag, the apparatus comprising:
   a) a body having a first side and a second side, the first side of said body defining a slot for receiving and locating said display tag with respect to said body;
   b) a plurality of contact pins located in said second side of said body and being mounted for movement into said slot in said first side of said body to contact the plurality of electrical contact pads of said display tag located in said slot, wherein said display tag comprises a front printable surface having at least one window for viewing a bistable liquid crystal display mounted on the back side of said display tag and between said front surface and said back side, and a plurality of exposed electrical contact pads on said back side of said display tag connected to a corresponding plurality of electrodes in said bistable liquid crystal display;
   c) drive electronics electrically connected to said contact pins for receiving display command signals from an external source and for applying electrical drive signals to said electrodes of said display when said contact pins are in contact with said electrical contact pads of said display tag; and
   d) operator control means for moving said contact pins into electrical contact with said electrical contact pads of said display tag and causing said drive electronics to apply said electrical drive signals to said contact pins.

2. The apparatus claimed in claim 1, the first and second sides being mounted by a hinge for pivotal movement with respect to one another and being urged away from one another by a spring, whereby an operator can squeeze the two sides together against the urging of the spring to move the contact pins into electrical contact with the electrical contact pads of a display tag located in the slot.

3. The apparatus claimed in claim 2, further comprising switch means located between the first and second sides and connected to the drive electronics for generating a signal when the sides have been squeezed together sufficiently to bring the contact pins into contact with the electrical contact pads.

4. The apparatus claimed in claim 3, wherein the switch means includes a pair of switches located at the ends of the slot, and wherein the signal is generated when both of the switches are actuated.

5. The apparatus claimed in claim 1, further comprising a data cable for connecting the drive electronics to a hand held computer.

6. A system for displaying information on display tags, comprising:
   a) a display tag having a front printable surface having at least one window for viewing a bistable liquid crystal display mounted on the back side of said display tag and between said front surface and said back side, and a plurality of exposed electrical contact pads on said back side of said display tag connected to a corresponding plurality of electrodes in said bistable liquid crystal display;
   b) a display tag programming device including:
      i) a hand held scanner unit having control electronics, a bar code scanner connected to the control electronics, a database containing display commands associated with bar codes on display tags, a user interface connected to the control electronics including a display and a button for activating the scanner, and
      ii) a display tag writing head connected to the hand held scanner unit for changing the display state of a liquid crystal display on a display tag, including a body having a first side and a second side, the first side defining a slot for receiving and locating the display tag with respect to the body, a plurality of contact pins located in the second side of the body and being mounted for movement into the slot in the first side of the body to contact the electrical contact pads of the display tag located in the slot, drive electronics electrically connected to the contact pins for receiving display command signals from an external source and for applying electrical drive signals to the electrodes of the display when the contact pins are in contact with the electrical contact pads, and operator control means for moving the contact pins into electrical contact with the electrical contact pads and causing the drive electronics to apply the electrical drive signals to the contact pins; and
   c) a central computer for generating display commands associated with bar codes; the central computer including means for transferring the display commands to the memory of the hand held scanner unit.

7. The system claimed in claim 6, wherein the display tag writing head is connected to the hand held scanner by a cable that supplies data and power to the writing head.

8. The system claimed in claim 6, wherein the display tag writing head is rigidly attached to the hand held scanner unit.

9. The system claimed in claim 6, wherein the means for transferring the display commands to the hand held scanner unit is a cradle connected to the central computer for physically receiving the hand held scanner unit.

10. The system claimed in 6, wherein the display tag is a price label having a hole for attaching the label to an item.

11. The system claimed in claim 6, wherein the display tag is a shelf label adapted to fit into a shelf label rail.

* * * * *